United States Patent [19]

Katoh et al.

[11] 4,370,686
[45] Jan. 25, 1983

[54] DRIVE MECHANISM FOR TAPE RECORDER

[75] Inventors: Noboru Katoh, Tokyo; Akio Kimura, Saitama, both of Japan

[73] Assignee: Sony Corporation, Tokyo, Japan

[21] Appl. No.: 160,588

[22] Filed: Jun. 18, 1980

[30] Foreign Application Priority Data

Jun. 20, 1979 [JP] Japan .................................. 54/77680

[51] Int. Cl.³ ....................... G11B 5/008; G11B 15/00
[52] U.S. Cl. .................................... 360/96.3; 360/137
[58] Field of Search ....................... 360/96.3, 96.2, 60, 360/105, 137; 242/201

[56] References Cited

U.S. PATENT DOCUMENTS

| | | | |
|---|---|---|---|
| 3,890,642 | 6/1975 | Platt | 360/96.3 |
| 4,118,602 | 10/1978 | Jacobson | 360/60 |
| 4,185,794 | 1/1980 | Mukaida | 242/201 |
| 4,202,220 | 5/1980 | Matsumoto | 242/201 |
| 4,225,894 | 9/1980 | Fulukawa | 360/137 |
| 4,253,123 | 2/1981 | Hayashi | 360/137 |
| 4,263,631 | 4/1981 | Takanashi | 360/96.3 |

Primary Examiner—Robert M. Kilgore
Attorney, Agent, or Firm—Hill, Van Santen, Steadman, Chiara & Simpson

[57] ABSTRACT

A driving mechanism for a tape recorder having a magnetic head and pinch roller having a first solenoid actuated plunger, said magnetic head and pinch roller being movable into and out of an actuating position by a lever associated with said first plunger, compact second and third solenoid actuated plungers forming operational modes of quick feeding and rewinding, a slider plate movable in opposite directions by said second and third plungers, a transmission mechanism connecting a drive source respectively with a supply reel and a take-up in the operation of said second and third plungers, a locking mechanism retaining a sliding position of said slider by operation of said first plunger and a lost motion mechanism adapted to inhibit the operation of said pinch roller at least in the operation of said second and third plungers, can form the operational modes of quick feeding and rewinding of the magnetic tape only by the use for triggering the operation of said compact plungers instead of larger ones to reduce power consumption through the miniaturizations of power transformer and miniaturize the whole tape recorder.

6 Claims, 4 Drawing Figures

DRIVE MECHANISM FOR TAPE RECORDER

FIELD OF THE INVENTION

The invention relates to the structure of a relatively light-weight compact drive mechanism for a tape recorder, and particularly to one which is economical to manufacture and one which is rugged and reliable in use. The structure provides for various operational modes including the reproducing mode, the rewind mode and the fast forward mode.

SUMMARY OF THE INVENTION

The drive mechanism herein disclosed includes a main deck upon which are mounted substrates which are pivotably or slidably mounted on the main deck. Solenoid actuated plungers are provided for shifting from one mode of operation to another. The drive mechanism for a tape recorder comprises a first plunger, a magnetic head, a pinch roller operated by a lever related to the first plunger. Compact second and third plungers provide for shifting to a quick feed and a quick rewind mode. A slider plate is moved in the opposite directions by the second and third plungers. A transmission mechanism connected respectively with a driving power source in the structure includes supply reel and take-up reel during the operation of the second and third plungers. A mechanism is provided for locking the slider plate in position according to the operation of the first plunger. A stop mechanism for stopping at least the operation of the pinch roller whenever the second or third plunger is in its operational mode is also provided.

DESCRIPTION OF THE PREFERRED EMBODIMENTS

Figure 1:
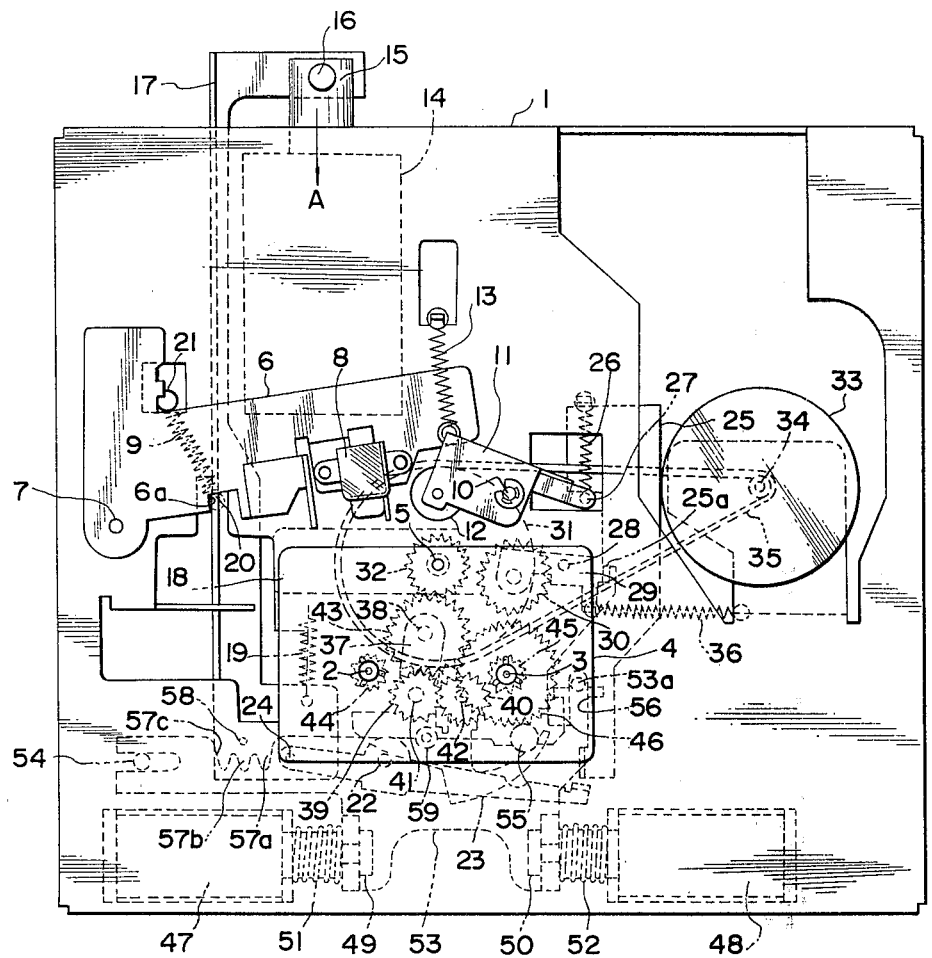
FIG. 1 is a plan view of the drive mechanism for a tape recorder according to the present invention.
Figure 2:
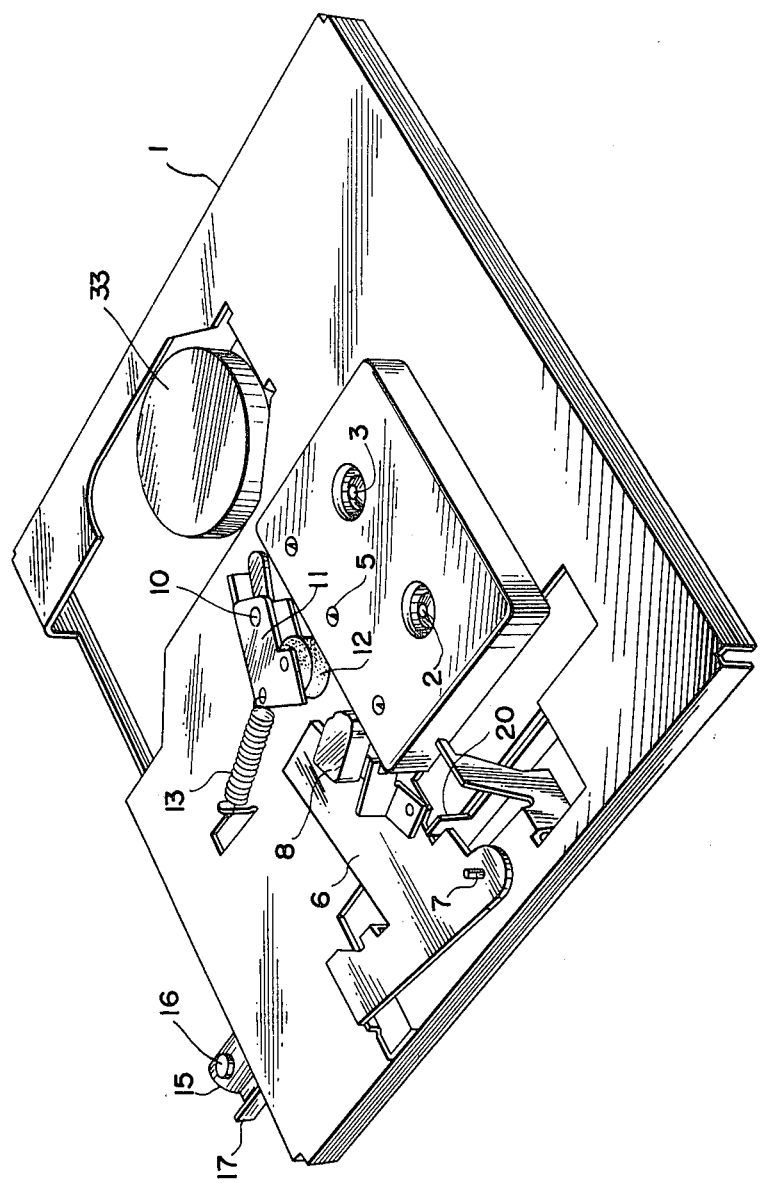
FIG. 2 is a perspective view of the same mechanism.

The reference numeral 1 designates a chassis or deck for the mechanism. A supply reel shaft 2 and a take-up reel shaft 3 are rotatably mounted on a cassette carrier plate 4. A capstan shaft 5 for driving the tape is provided as shown. A magnetic recording and/or reproducing head 8 is carried on a head substrate 6 which is pivoted about a stud 7 in the main deck 1. The magnetic head 8 is secured fixedly to the upper surface of the head substrate 6. Further, this head substrate 6 is urged normally forward by a spring 9 provided below the main deck 1. On the main deck 1, near said cassette carrier plate 4, is mounted on an arm 11 which is pivoted about a stud 10 located on the main deck 1. On the end of this arm 11 is pivotably mounted a pinch roller 12. This arm 11 is urged normally clockwise by a spring 13. Also tape guides (not shown) are provided on the magnetic head 8.

Figure 3:
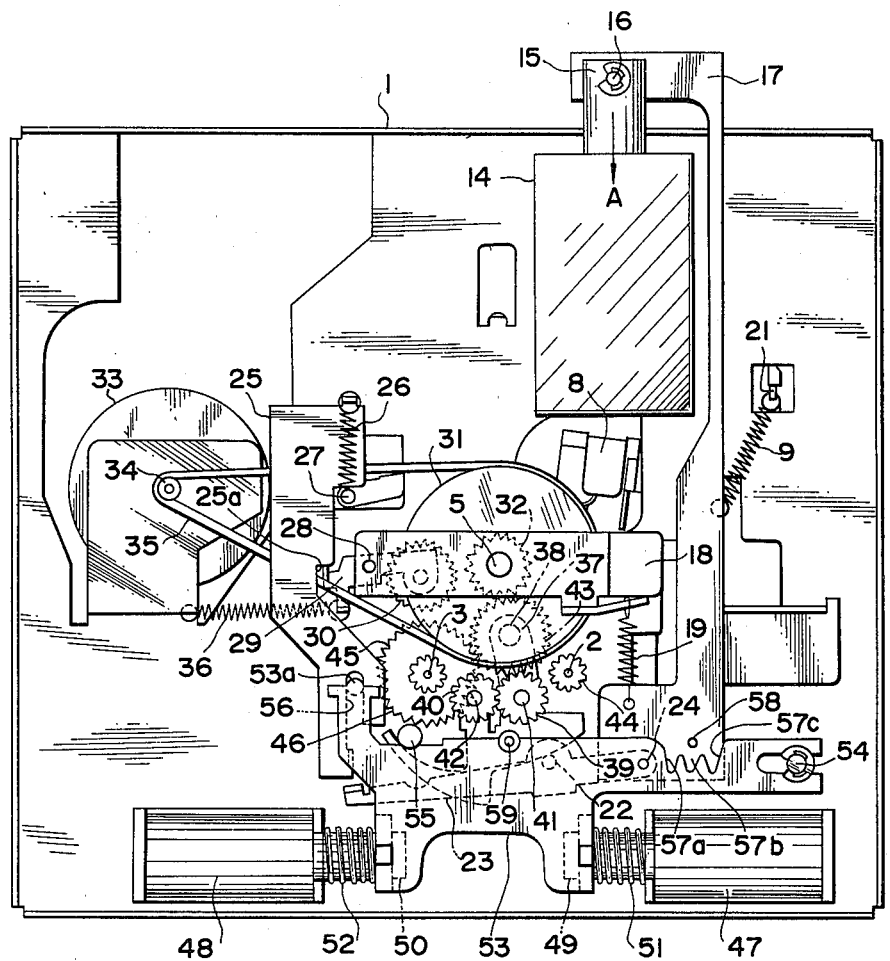
FIG. 3 is a bottom view of the same mechanism.
Figure 4:
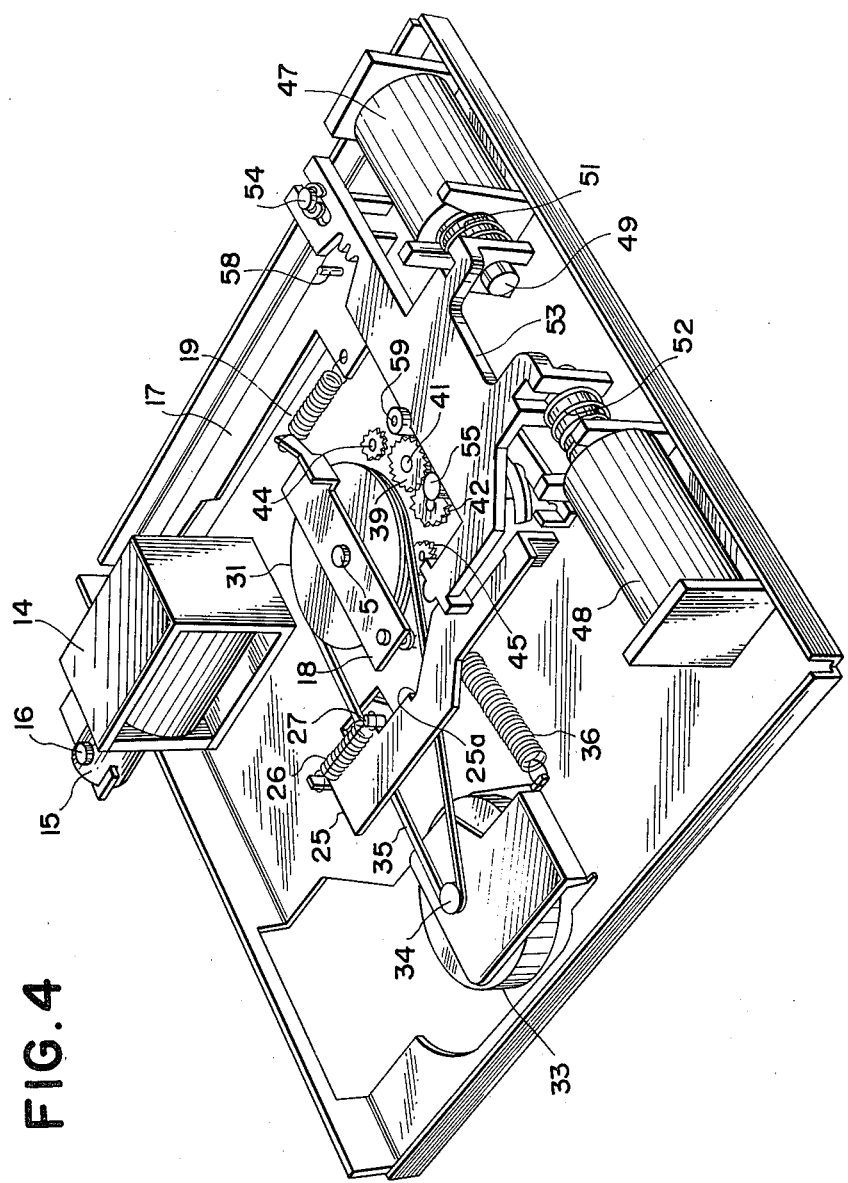
FIG. 4 is a perspective bottom view of the same mechanism.

On the other hand, about a shaft 16 on the end of a pole r end of this main arm 17 and a mounting plate 18 for a fly wheel to be described later is tensioned a spring 19 to urge normally rearward this main lever 17. Said spring 9 is tensioned between a lug 20 projecting upward from the middle of the main lever 17 and a lug 21 depending from said head substrate 6. Further, the upper end of said lug 20 engages a notch 6a provided on the head substrate 6. The head substrate 6 is urged rearward by said spring 19. A pivotable lever 23 is pivotably mounted about a shaft 22 planted in the front lower surface of the mechanism substrate 1, and one end of this pivotable lever 23 is pivoted about a shaft 24 on said other end of the main lever 17. Also, the other end of this pivotable lever 23 faces the front edge of a straight moving lever 25 moving forward and backward. The rear end of this straight moving lever 25 is associated with a pin 27 projectingly provided on the lower surface of the end of said arm 11 through a spring 26. One end of an L-shaped lever 29 pivoted about a stud 28 engages a lug 25a of said straight moving lever 25, and an idler gear 30 mounted on the other end of the L-shaped lever 29 meshes with a center gear 32 mounted on a shaft of a fly wheel 31. A belt 35 is trained over a pulley 34 mounted on the rotary shaft of a motor 33 mounted on the mechanism substrate and a V-groove of said fly wheel 31. A spring 36 is tensioned between this L-shaped lever 29 and mechanism substrate 1 to urge normally said L-shaped lever 29 clockwise in FIG. 3. A pivotable lever 37 pivoted about a shaft 38 located on the lower surface of the mechanism substrate 1 has two shafts 41, 42 on which gears 39, 40 respectively are rotatably mounted meshing with each other. On said shaft 38 is mounted a gear 43 meshing with the gear 39. Pinions 44, 45 are mounted respectively on said reel shafts 2, 3, and on the reel shaft 3 is mounted another large-sized gear 46 through a clutch such as friction clutch. On the other hand, compact plungers 47, 48 respectively for rewinding and quick-feeding are mounted the front back portion of the mechanism substrate 1, and pole pieces 49, 50 of these plungers are associated with a slider plate 53 respectively through return springs 51, 52. This slider plate 53 is guided on one end horizontally by pins 54, 55, and on the other end has an upright lug 53a inserted into a notch 56 on one end of said straight moving lever 25. Three grooves 57a, 57b and 57c are cut in the side edge of said slider plate 53 and opposed to a pin 58 planted in the lower surface of said main lever 17. Also, a pin 59 standing on the slider plate 53 extends through a through hole provided in said pivotable lever 37.

Next, the operation of said driving mechanism will be described.

When the power switch is first closed, the motor 33 is driven to rotate the pulley 34, belt 35, fly wheel 31 and center gear 32, simultaneously. Also, the main plunger 14 is energized to draw the pole piece 15 in the direction of arrow A, to slide also the main lever 17 in the same direction and to put said pin 58 into said groove 57b in the middle of said slider plate 53. Thus, the slider plate 53 is retained. On the other hand, the main lever 17 permits the pivotable lever 23 to be pivoted about the shaft 22 for thereby moving rearward the straight moving lever 25. The arm 11 associated with this straight moving lever 25 through the spring 26 is pivoted about the shaft 10 to urge the pinch roller 12 against the tape in a tape cassette (not shown) on the cassette carrier plate 4. This spring 26 acts as a limiter for the arm 11. Also, since one end of the L-shaped lever 29 contacts the lug 25a of said straight moving lever 25, the L-shaped lever 29 pivots about the shaft 28 so that the gear 30 mounted on this L-shaped lever 29 meshes with the center gear 32 and gear 46. Thus, the reel shaft 3 for rewinding is rotated which is associated with this gear 46. Also, since the head substrate 6 is associated with the main lever 17 through the spring 9, the head substrate 6 is pivoted forward about the shaft 7 by said movement of the main lever 17 to make the magnetic head 8 contact the magnetic tape in tape cassette at a predetermined stop position, whereupon reproducing operation is carried out. Further, the spring 9 serves to absorb the overstroke of the main arm 17.

Next, will be described the quick feed operation.

In said reproduction, a button switch for quick feeding and others are operated after the power supply is put to work. Then the solenoid plunger 48 is energized to draw the pole piece 50 to the right in FIG. 1. Thus, the slider plate 53 also moves in the same direction. Immediately after that, the said plunger of the solenoid 14 operates to move the main arm 17 forward and put the pin 58 into the left groove 57a (FIG. 3) cut on the left side of the slider plate 53. Hence the slider plate 53 is fixedly retained where it is moved. Under such a condition, the solenoid 47 is deenergized to prevent power loss. Also, the pivotable lever 37 interlocked with the slider plate 53 is biased to the right in FIG. 3 by the operation thereof so that the gears 40 and 45 mesh with each other. Since the gear 40 is driven by the motor 33 through the gears 39, 43 and 32, the reel shaft 3 on the take-up side is rotated. Also, since the straight moving lever 25 associated with said slider plate 53 is pivoted about the shaft 27 clockwise in FIG. 3 by said movement of the slider plate 53, the pivotable lever 23 urged by the main lever 17 can not press the front edge of the straight moving lever 25. Hence, the straight moving lever 25 is not moved rearwardly so that neither the arm 11 of pinch roller 12 nor the L-shaped lever 29 of idler gear 30 operates. Accordingly, the pinch roller 12 is not pressed against the capstan 5. Then the head substrate 6 interlocked with the main lever 17 is pivoted about the shaft 7 as above mentioned so that the magnetic head contacts the magnetic tape in the tape cassette. Thus, the magnetic tape will be quickly taken up and cue stop signal will be detected from the magnetic tape.

The rewinding operation will now be described.

As in said reproduction, after the power switch is closed, a button switch for rewinding and others are operated. Then the compact plunger 47 is energized to draw the pole piece 49 leftward in FIG. 1. At the next instant, the main plunger 14 operates to push the pin 58 of main lever 17 into the groove 57a at the right side of FIG. 1 of the slider plate 53 moved by said pole piece 49.

Then the slider plate 53 is retained where at the position where it was moved. After such operation, the compact solenoid 47 is deenergized. Also, the pivotable lever 23 can not press the front edge of the straight moving lever 25 due to the left movement of the slider plate 53 so that the straight moving lever 25 is left stopped. Thus, neither the pinch roller 12 nor idler gear 30 operates. However, the head substrate 6 interlocked with the main lever 17 pivots about the shaft 7 so that the magnetic head 8 contacts the magnetic tape in the tape cassette. Further, in this case, the gear 39 is adapted to mesh with the gear 44 by the movement of said slider plate 53 so that the reel shaft 2 at the supply side is rotated to rewind the magnetic tape. Thus, the cue stop signal on the magnetic tape is detected so that the locating of the magnetic tape and the like can be automatically carried out.

As above mentioned, the driving mechanism for tape recorder according to the present invention, provided with a first plunger, a magnetic head and pinch roller operated by a lever associated with the first plunger, compact second and third plungers forming operational modes of quick feeding and rewinding, a slider plate moved in opposite directions by these second and third plungers, a transmission mechanism connecting a drive source respectively with a supply reel and take-up reel in the operation of the second and third plungers, a locking mechanism retaining a sliding position of said slider plate by the operation of said first plunger and a lost motion mechanism adapted to inhibit the operation of said pinch roller at least in the operation of said second and third plungers, can form the operational modes of quick feeding and rewinding of the magnetic tape only by the use for triggering the operation of compact plungers instead of larger ones to reduce power consumption through the miniaturization of power transformer and miniaturize the whole tape recorder. Thus, it has many advantages such as cost reduction of tape recorder manufacturing, improvement of design, etc.

It will be apparent to those skilled in the art that many modifications and variations may be effected without departing from the spirit and scope of the novel concepts of the present invention.

We claim as our invention:

1. A drive mechanism for a tape recorder comprising, a chassis, a magnetic head and a pinch roller movable from an inoperative position to an operative position to place a magnetic tape against said magnetic head, a transmission mechanism driven by a drive source and engageable with a supply and a take-up reel, respectively, for forming operational modes of quick feeding and rewinding, a slidable plate for supporting said transmission mechanism slidably mounted on said chassis and movable from a neutral position to a first operative position whereby said transmission mechanism is placed in engagement with said supply reel and movable from a neutral position to a second operative position whereby said transmission mechanism is in engagement with said take-up reel, spring means for biasing said slidable plate to said neutral position, a linkage mechanism linking a first plunger with said pinch roller when said slidable plate is in said neutral position, a second plunger connected to move said slidable plate from said neutral position to said first operative position, a third plunger connected to move said slidable plate from said neutral position to said second operative position, a locking means connected to said first plunger to be moved from a first position to a second position by said first plunger for locking said slidable plate in its said first and second operative positions against the biasing force provided by said spring means when said second or third plunger is de-energized.

2. A drive mechanism for a tape recorder as claimed in claim 1 wherein said transmission mechanism has a pair of transmission gears meshing with each other and respectively rotating in opposite directions.

3. A drive mechanism for a tape recorder as claimed in claim 1, wherein said linkage mechanism comprises a moving lever which can be changed in position by said slidable plate and a pivotable lever linking said moving lever to move said pinch roller when said slidable plate is in said neutral position.

4. A drive mechanism for a tape recorder as claimed in claim 1, wherein said slidable plate having two locked portions is locked by said locking means operated by said first plunger.

5. A drive mechanism for a tape recordein claim 4, wherein said slidable plate having two locked portions comprise two V-shaped notches, and wherein said locking means comprises a slidable lever having a projection for engagement with said V-shaped notches.

6. A drive mechanism for a tape recorder as claimed in claim 3 wherein said slidable lever moves said pivotal lever.

* * * * *